United States Patent [19]
Graham

[11] Patent Number: 5,757,092
[45] Date of Patent: May 26, 1998

[54] VIBRATORY DRIVE UNIT

[76] Inventor: S. Neal Graham, 12997 Fawns Ridge, Fishers, Ind. 46038

[21] Appl. No.: 595,836

[22] Filed: Feb. 2, 1996

[51] Int. Cl.$^6$ .......................... H02K 33/00; H02K 33/02; H02K 11/00; B65G 27/24
[52] U.S. Cl. ........................ 310/15; 198/769; 310/71
[58] Field of Search ........................ 310/15, 71, 17; 439/551, 571, 926; 198/761, 769; 209/368, 415

[56] References Cited

U.S. PATENT DOCUMENTS

| | | | |
|---|---|---|---|
| 3,087,603 | 4/1963 | Petrea | 198/769 |
| 3,703,233 | 11/1972 | Hacker | 198/769 |

*Primary Examiner*—Clayton E. LaBalle
*Attorney, Agent, or Firm*—Woodard, Emhardt, Naughton Moriarty & McNett

[57] ABSTRACT

A vibratory drive unit of modular construction includes a bottom plate, a first side plate attached to one side of the bottom plate, a second side plate attached to an opposite side of the bottom plate, a front plate attached to the bottom plate, first side plate and second side plate, and a rear plate structure attached to the bottom plate and each of the side plates. The plates define a cavity therebetween, which cavity is configured to receive a mass therein and a vibratory drive means positioned between the mass and the front plate. The modular construction provides for easy replacement of any of the modular components. The vibratory drive unit is further configured to permit maximum air flow about the vibratory drive means, and to provide for accurate positioning of the vibratory drive means relative to a drive plate of an attached parts bin.

8 Claims, 6 Drawing Sheets

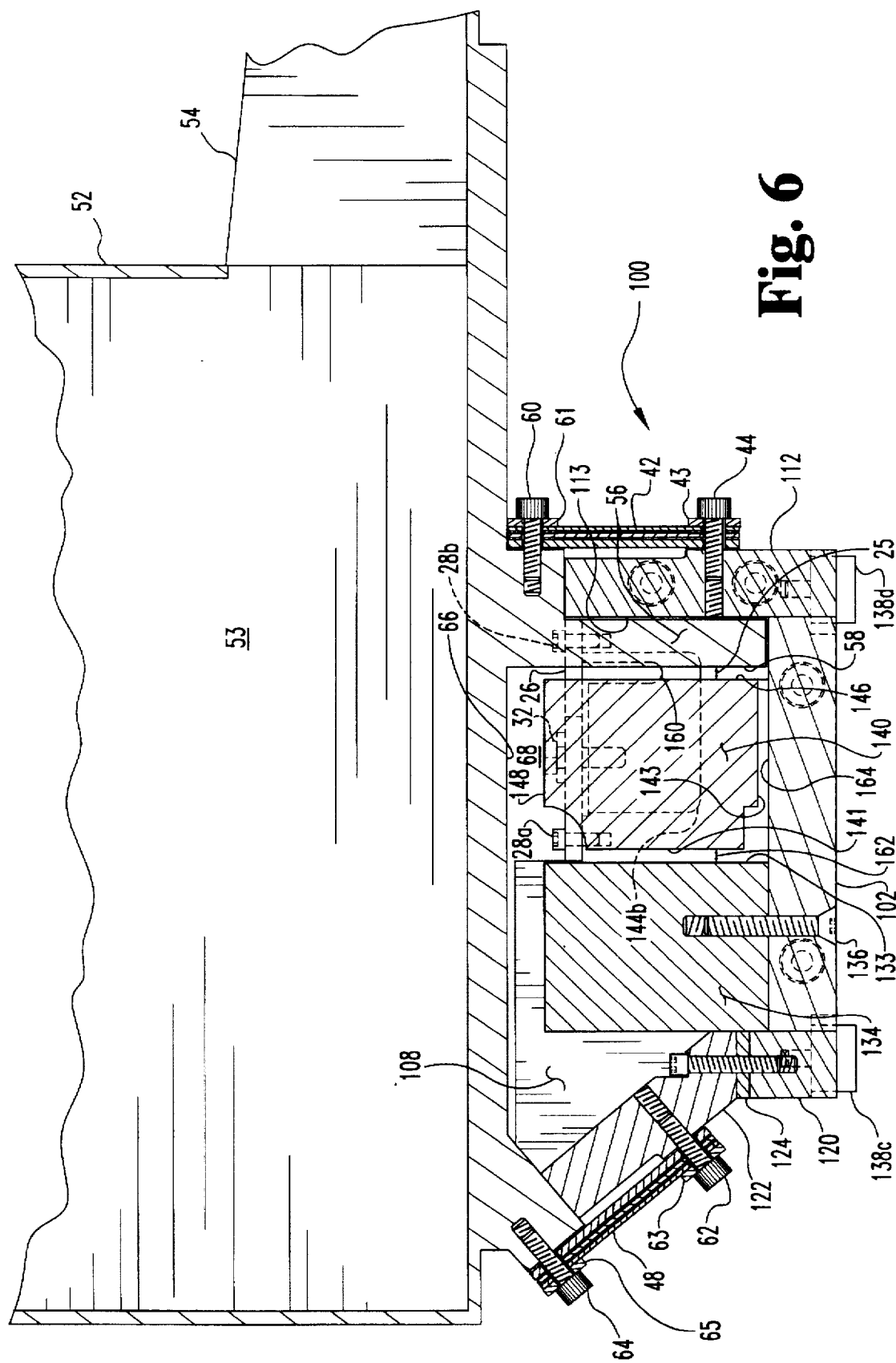

VIBRATORY DRIVE UNIT

FIELD OF THE INVENTION

The present invention relates generally to drive units associated with parts feeders, and more specifically to such drive units associated with linear parts feeders.

BACKGROUND OF THE INVENTION

Vibratory parts feeders are commonly known apparatuses for providing oriented parts from a mass of disoriented parts, for transporting parts along a processing path, and/or for feeding and maintaining a predetermined quantity of parts to a parts orienting feeder. A common requirement of any of the foregoing parts feeders is a drive unit operable to impart the necessary vibratory feed motion to the parts feeder.

In the design of linear, or so-called auxiliary, vibratory parts feeders, an established industry practice is to attach a parts bin to a stationary drive unit via a plurality of drive springs. Vibratory action is created at the drive unit, by suitable means, which vibratory action is transferred to the parts bin via the drive springs. By properly positioning the drive springs to establish an appropriate vibratory direction, the parts bin is made to vibrate in such a manner as to correspondingly transport parts from the parts bin to a desired location.

An example of one known linear vibratory drive unit 10 is shown in FIGS. 1–3. Vibratory drive unit 10 is often used to supply parts from a large parts bin attached thereto to a smaller capacity parts-orienting feeder (not shown).

Referring to FIG. 1, vibratory drive unit 10 includes a body 12, typically of uniform construction, which may be provided in accordance with a known metal casting operation. Body 12 includes a mass 14 mounted therein, wherein mass 14 provides drive unit 10 with sufficient mass to effectively vibrate a parts-containing bin mounted thereto. Drive unit 10 further includes an electromagnetic coil 16 mounted between mass 14 and a front face 19 of body 12 (see FIG. 3).

A bracket 18 is mounted to body 12 via fasteners 20a and 20b adjacent one side of electromagnetic coil 16, and a second bracket 26 is mounted to body 12 via fasteners 28a and 28b adjacent the opposite side of electromagnetic coil 16. Electromagnetic coil 16 is adjustably mounted to brackets 18 and 26 via fasteners 24 and 32 extending through elongated slots 22 and 30, respectively, and attached to coil 16. Coil 16 may be adjustably positioned toward and away from front face 19 of body 12 by loosening fasteners 24 and 32 and sliding the fastener 24, 32, and coil 16 combination within slots 22 and 30. Once positioned at a desired location, coil 16 can be rigidly secured to brackets 18 and 26 by tightening each of fasteners 24 and 32.

Body 12 includes a bore, or channel, 34 therethrough, through which electrical cable 36 extends. One end of electrical cable 36 is electrically connected to electromagnetic coil 16 (not shown), and the opposite end is electrically attached to an electrical connector 38. In operation, electrical connector 38 is connected to a source of electrical power (not shown) to thereby power electromagnetic coil 16.

Vibratory drive unit 10 may include a number of vibration dampening feet 40 attached to the bottom thereof, to stabilize drive unit 10 on its supporting surface. Alternatively, drive unit 10 may include provisions (not shown) for mounting body 12 to its supporting surface.

Referring now to FIGS. 1 and 3, vibratory drive unit 10 includes a pair of springs 42 and 48 mounted to the front and rear of drive unit 10, respectively. Spring 42 is mounted to the front of drive unit 10 via a number of fasteners 44, with a washer 43 positioned therebetween. Spring 42 further includes a number of bores 46 therethrough for attachment to a parts bin. Spring 48 is attached to the rear of drive unit 10 via a number of fasteners 62, with a washer 63 positioned therebetween. Spring 48 also includes a number of bores 50 therethrough to permit spring 48 to be attached to a parts bin.

Referring now to FIG. 2, vibratory drive unit 10 is shown having a parts bin 52 operatively positioned atop thereof. Parts bin 52 is often referred to as an "auxiliary" parts bin, and defines a large cavity 53 therein for receiving a large volume of parts and an elongated feed opening 54 extending away from the bottom of parts bin 52. Referring to FIG. 3, spring 42 is attached to parts bin 52 via a number of fasteners 60 extending through bores 46 (FIG. 1), with a washer 61 positioned therebetween. Similarly, spring 48 is attached to parts bin 52 via a number of fasteners 64 extending through bores 50 (FIG. 1), with a washer 65 positioned therebetween. Springs 42 and 48 are strategically positioned with respect to vibratory drive unit 10 and parts bin 52 to provide an appropriate feed motion to parts feeder opening 54. Specifically, springs 42 and 48 are positioned to provide a linear motion of parts from bin 53 to parts feeder opening 54 in the direction of arrow 55. Further, spring 48 is provided at an angle with respect to spring 42 to provide parts bin 52 with sufficient lift at the rear thereof to thereby urge parts toward opening 54 and maintain a steady flow of parts therefrom.

Parts bin 52 further includes a plate 56 extending therefrom and into body 12 of vibratory drive unit 10. Specifically, plate 56 extends between coil 16 and front face 19 of body 12. A rear face, or so-called "pole face" 58 of plate 56 is positioned opposite a front face 17 of coil 16 to define a gap 25 therebetween. The width of gap 25 is adjustable by adjusting electromagnetic coil 16 within slots 22 and 30 as previously discussed. In operation, the front face 17 of coil 16 is periodically magnetized as is known in the art to attract pole face 58 of parts bin 52 thereto, thus deforming springs 42 and 48 rearwardly. During the period when front face 17 of coil 16 is de-magnetized, springs 42 and 48 move in an opposite direction to thereby provide lift and linear feed motion to parts contained within cavity 53 of parts bin 52, and thus provide a constant flow of parts from feed opening 54.

Although vibratory drive unit 10 has been generally accepted in the parts feeding industry, and has thus enjoyed widespread use, it has several drawbacks associated therewith. First, the unitary construction of body 12 makes repairs thereto difficult or impossible. For example, if an operable part of body 12 breaks, or if any of the fasteners described hereinabove damages its corresponding bore provided within body 12, then the entire body 12 must be replaced. Such replacement can be costly and, in any event, is wasteful of the undamaged portions of body 12.

A second drawback associated with vibratory drive unit 10 lies in the difficulty of properly positioning front face 17 of electromagnetic coil 16 with respect to pole face 58 of parts bin 52. Referring to FIG. 3, bottom surface 66 of parts bin 52 and top surface 15 of electromagnetic coil 16 define a space 68 therebetween which provides the only access to fasteners 24 and 32 to permit adjustment of gap 25. Since space 68 is typically only large enough to accept a tool for adjusting fasteners 24 and 32, gap 25 is typically "eye-balled" in the setting thereof. Such "eye-balling" of gap 25 often results in improperly setting the width of gap 25. If the width of gap 25 is set too narrow, the front surface 17 of coil 16 has a tendency to strike pole face 58 in the operation of drive unit 10. If, on the other hand, the width of gap 25 is set too wide, coil 16 requires excessive amperage to impart the appropriate vibratory motion. In either case, improper setting of the width of gap 25 results in damage to, or inefficient operation of, coil 16, which acts to decrease, sometimes significantly, the operating life of coil 16.

A third drawback associated with vibratory drive unit 10 is the accessibility of electrical cable 36. With electrical cable 36 accessible outside of body 12, it is susceptible to damage, even through normal use of vibratory drive unit 10. Further, electrical connection between cable 36 and coil 16 may become broken due to excessive handling of cable 36.

A fourth drawback associated with vibratory drive unit 10 is the heat generated through normal operation of coil 16, and the relatively inefficient dissipation thereof. With coil 16 positioned within body 12, and with the bottom surface 66 of parts bin 52 in close proximity with the top surface 15 of coil 16, relatively little amount of air flow occurs about coil 16. As such, heat generated by coil 16 must be dissipated by body 12, which heat dissipation is typically inefficient.

In view of the foregoing drawbacks of prior art vibratory drive units, such as drive unit 10, what is needed is a vibratory drive unit having replaceable components and that is configured to permit accurate setting of the width of gap 25. The body and drive coil of such a vibratory drive unit should further be configured to permit air to flow around the coil to thereby maintain an acceptable operating temperature thereof. Preferably, such a vibratory drive unit should further have an electrical connector attached to the body thereof so that the electrical cable of the electromagnetic coil may be safely contained within the drive unit body.

SUMMARY OF THE INVENTION

The foregoing drawbacks of prior art vibratory drive units are overcome by the present invention. A vibratory drive unit, in accordance with the present invention, is constructed of modular components which may be individually replaced as needed. Central to the vibratory drive unit is a bottom plate having a front wall, a rear wall opposite the front wall, a first sidewall and a second sidewall opposite the first sidewall. A first side plate is detachably mounted to the first sidewall of the bottom plate, and a second side plate is detachably mounted to the second sidewall of the bottom plate. A front plate is detachably mounted to the front wall of the bottom plate and to each of the first and second side plates. A rear plate is further detachably mounted to the rear wall of the bottom plate and to each of the first and second side plates. As constructed, the first and second side plates, the front plate, the rear plate, and the bottom plate define a cavity therebetween. The cavity of the vibratory drive unit includes a vibratory drive means adjustably positionable therein.

In accordance with another aspect of the present invention, a parts bin is attached to the drive unit via a number of drive springs, wherein the parts bin has a drive plate extending into the cavity adjacent the vibratory drive means. At least one of the first and second sidewalls defines a slot therethrough which is positioned between the vibratory drive means and the drive plate. The slot may be used to permit a gauge to be inserted between the vibratory drive means and the drive plate to establish a predefined gap therebetween.

In accordance with yet another aspect of the present invention, the cavity further includes a mass mounted therein, wherein the vibratory drive means is positioned relative to the mass, the drive plate, and each of the opposing sidewalls, to define an air gap therebetween.

In accordance with still another aspect of the present invention, one of the sidewalls defines a bore therethrough, and the vibratory drive unit further includes an electrical power cord having a first end electrically connected to the vibratory drive means and a second opposite end attached to an electrical connector, wherein the electrical connector is received within the bore and detachably mounted to the sidewall so that the power cord is completely housed within the cavity.

One object of the present invention is to provide a vibratory drive unit constructed of modular components, which modular components may be replaced as needed.

Another object of the present invention is to provide a vibratory drive unit having a vibratory drive means mounted within a body thereof and a pole face of a parts bin disposed adjacent thereto, wherein the body defines a slot therethrough adjacent the vibratory drive means and pole face to permit a gap gauge to extend therethrough and between the vibratory drive means and pole face.

Yet another object of the present invention is to provide a vibratory drive unit having a vibratory drive means mounted within a cavity thereof, wherein the vibratory drive means and cavity are configured to permit air to flow about the vibratory drive means.

Still another object of the present invention is to provide a vibratory drive unit having vibratory drive means mounted therein, wherein an electrical power cord connected at one end to the vibratory drive means is contained within the unit and attached at a second opposite end thereof to the unit.

These and other objects of the present invention will become more apparent from the following description of the preferred embodiment.

BRIEF DESCRIPTION OF THE DRAWINGS

FIG. 6 is a cross-sectional view similar to FIG. 3, shown with the vibratory drive unit of the present invention in place of the prior art vibratory drive unit of FIG. 3.

DESCRIPTION OF THE PREFERRED EMBODIMENT

Figure 1:
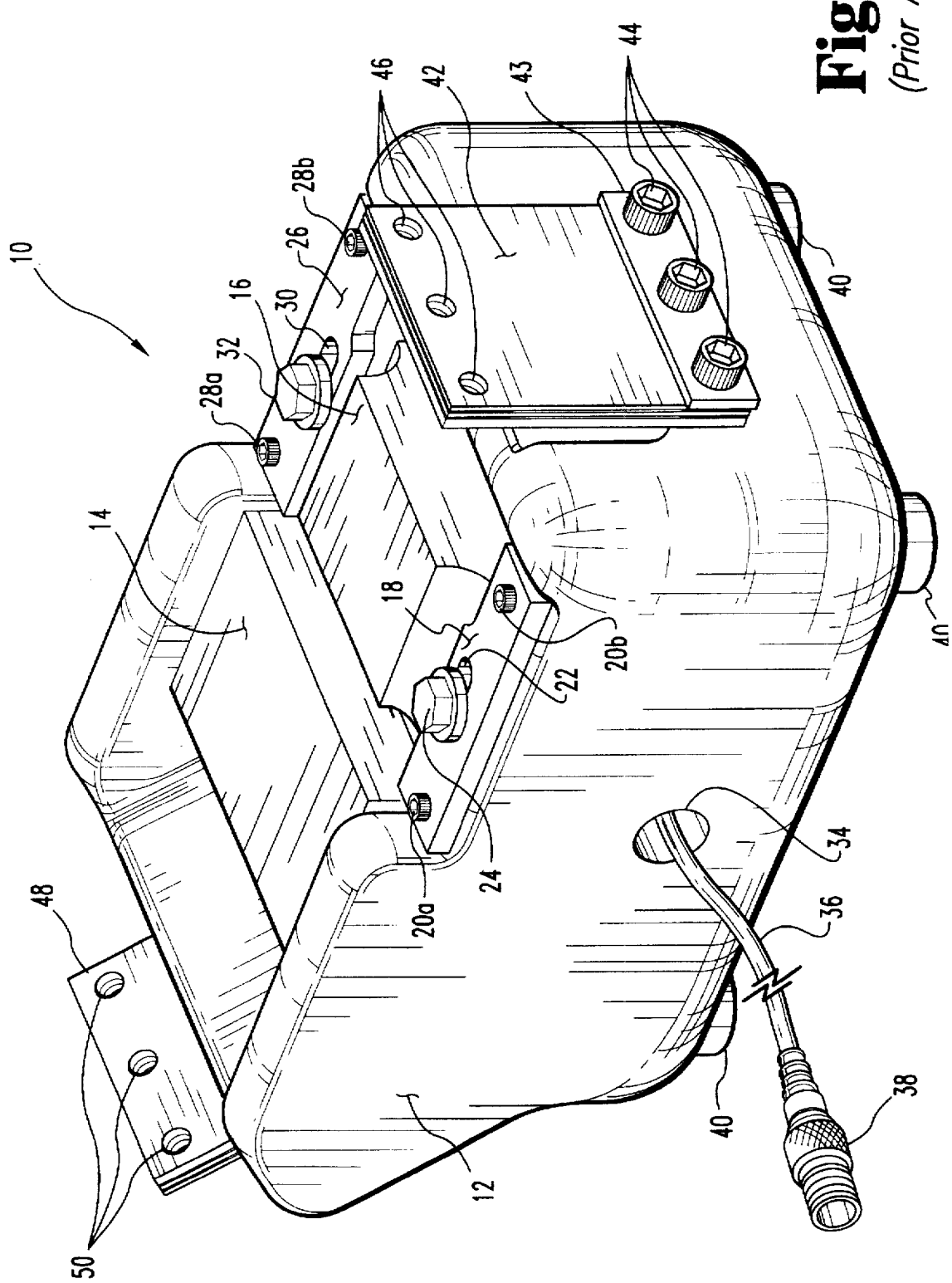
FIG. 1 is a perspective view of a prior art vibratory drive unit.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
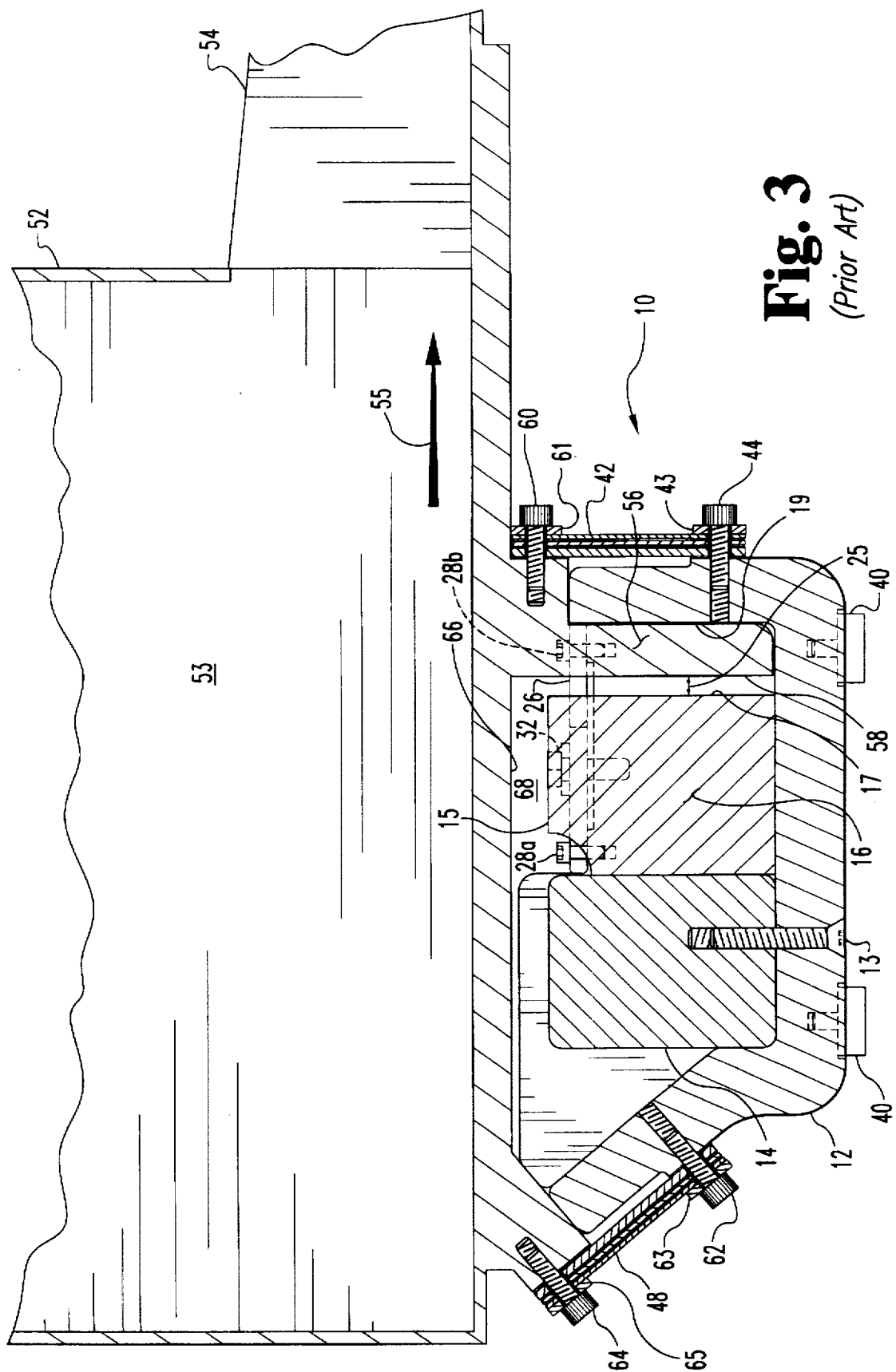
FIG. 3 is a cross-sectional view of the vibratory drive unit and parts bin of FIG. 2, taken along sections lines 3—3 thereof.
Figure 4:
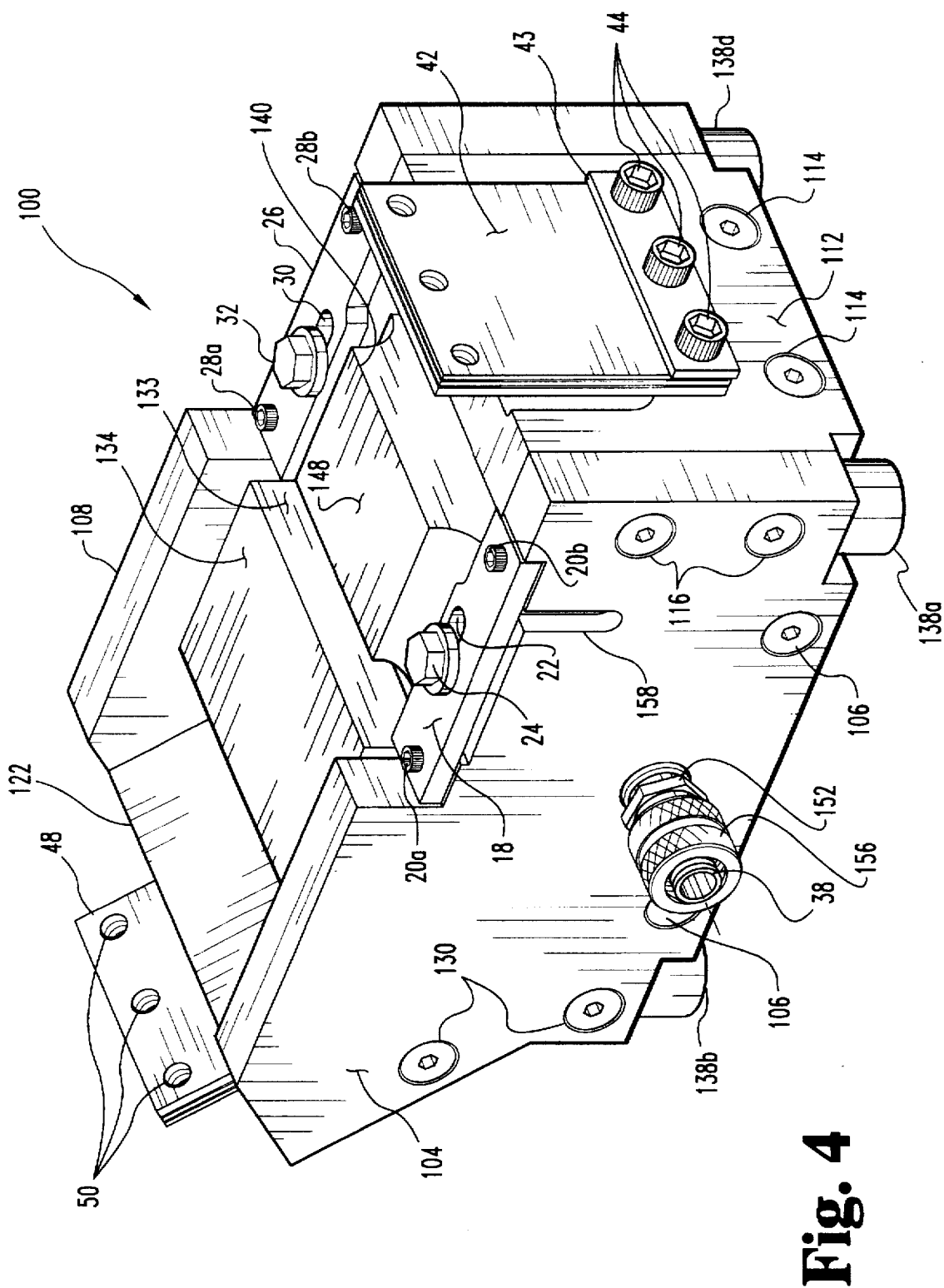
FIG. 4 is a perspective view of a vibratory drive unit, in accordance with the present invention.
Figure 5:
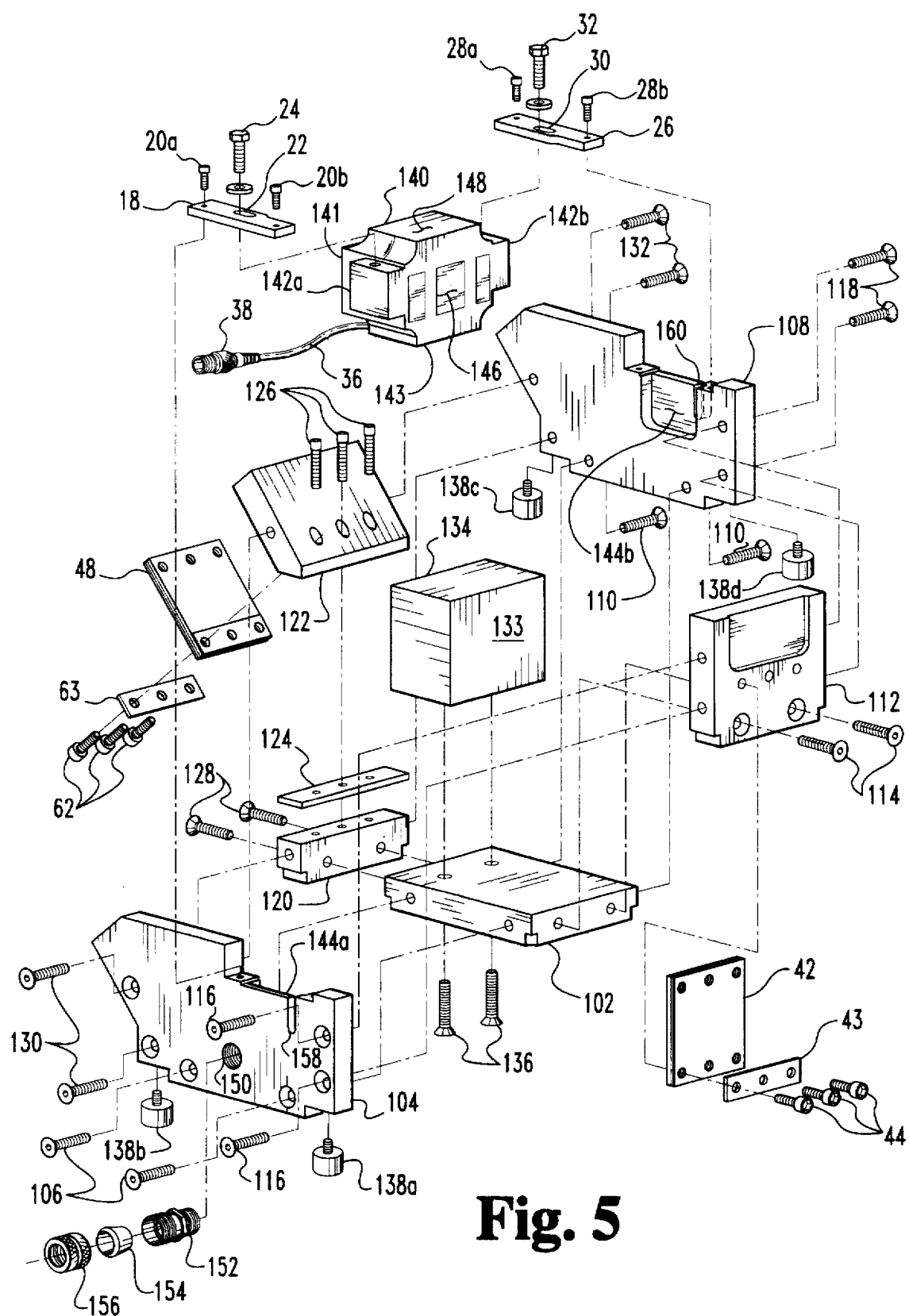
FIG. 5 is an assembly illustration of the vibratory drive unit of FIG. 4.

Referring now to FIGS. 4–6, a vibratory drive unit 100, in accordance with the present invention, is shown. Some components of vibratory drive unit 100 are identical to corresponding components of vibratory drive unit 10, shown and described with respect to FIGS. 1–3, and like numbers will therefore be used to describe like components. Referring specifically to FIGS. 4 and 5, vibratory drive unit 100 includes a bottom, or base, plate 102 having a plurality of bores defined therein. A left side plate 104 is attached to a left sidewall of bottom plate 102 via fasteners 106. Preferably, fasteners 106 are threaded, as are the corresponding bores within bottom plate 102, although the present invention contemplates using any fastener which may be removed and reapplied and/or replaced. A right side plate 108 is similarly attached to a right sidewall of bottom plate 102 via a pair of fasteners 110 extending through bores defined through plate 108 and into corresponding bores defined within bottom plate 102. As with fasteners 106, fasteners 110 are preferably threaded, as are the corresponding bores defined within bottom plate 102.

A front plate 112 is attached to a front wall of bottom plate 102 via fasteners 114 extending through bores defined through front plate 112, and into corresponding bores defined within bottom plate 102. A pair of fasteners 116 extend through bores defined through left side plate 104 and into corresponding bores defined within a left side of front plate 112, and a pair of fasteners 118 extend through bores defined through right side plate 108 and into corresponding bores defined within a right side of front plate 112.

A rear base plate 120 is attached to a rear wall of bottom plate 102 via a pair of fasteners 128 extending through bores defined through rear base plate 120 and extending into corresponding bores defined within bottom plate 102. A rear angled plate 122 is attached to rear base plate 120 via three fasteners 126 extending through bores defined through angled plate 122 and extending through a washer 124 into corresponding bores defined within rear base plate 120. The combination of rear base plate 120, rear angled plate 122, and washer 124 define a rear plate. The left side plate 104 is attached to the rear plate, comprising rear base plate 120 and rear angled plate 122, via fasteners 130 extending through bores defined through left side plate 104 and into corresponding bores defined within rear base plate 120 and rear angled plate 122. Similarly, the right side plate 108 is attached to the rear plate, comprising rear base plate 120 and rear angled plate 122, via a pair of fasteners 132 extending through bores defined through right side plate 108 and into corresponding bores defined within a right side of rear base plate 120 and rear angled plate 122. Fasteners 106, 110, 114, 116, 118, 126, 128, 130, and 132 are preferably threaded, as are the corresponding bores to which they are attached, so that the fasteners can be suitably advanced to rigidly secure bottom plate 102, left side plate 104, right side plate 108, and the rear plate, comprising rear base plate 120 and rear angled plate 122, in the form of a housing defining a cavity therein.

A mass 134 is attached to bottom plate 102 via a pair of fasteners 136 extending through bores defined through bottom plate 102 and into corresponding bores defined within mass 134. Mass 134 may have any desired mass, it being understood that mass 134 must have at least as much mass as that of a parts bin, containing parts therein, attached to vibratory drive unit 100.

Left side plate 104 and right side plate 108 are preferably each configured along a bottom surface thereof to receive a plurality of feet attached thereto. Specifically, left side plate 104 has a foot 138a attached to an underside thereof adjacent fasteners 106 and 116, and a foot 138b attached to an underside thereof adjacent fasteners 106 and 130. Similarly, right side plate 108 has a foot 138c attached to the underside thereof adjacent fasteners 118 and 132, and a foot 138d attached to an underside thereof adjacent fasteners 110 and 118.

A vibratory drive means 140, which is preferably an electromagnetic vibratory drive coil, although the present invention contemplates that other known vibratory drive means may be used with vibratory drive unit 100, is received within vibratory drive unit 100 and disposed between mass 134 and front plate 112. Vibratory drive means 140 is preferably configured as an electromagnetic vibratory drive coil having a rear face 141, a pair of ears 142a and 142b extending away from opposite sides thereof, a front face 146, a top surface 148 and a bottom surface 143. An electrical cable 36 is electrically connected to coil 140 at one end thereof, the opposite end having an electrical connector 38 electrically connected thereto.

A bracket 18 is attached to a top surface of left side plate 104 via fasteners 20a and 20b, and a similar bracket 26 is attached to a top surface of right side plate 108 via fasteners 28a and 28b. Left side plate 104 includes a recess 144a for receiving ear 142a of coil 140, and right side plate 108 similarly includes a recess 144b for receiving ear 142b of coil 140. With coil 140 so positioned within vibratory drive unit 100 such that rear face 141 is disposed opposite a front face 133 of mass 134, ear 142a is slidably disposed within recess 144a, ear 142b is slidably disposed within recess 144b, and front face 146 is disposed opposite front plate 112. Brackets 18 and 26 are attached to coil 140 via a first fastener 24 extending through slot 22 defined through bracket 18 and into a corresponding bore defined within ear 142a, and a second fastener 32 extends through slot 30 of bracket 26 and into a corresponding bore defined within ear 142b of coil 140. Coil 140 may thus be adjustably positioned within slots 22 and 30 such that the distance between front face 146 and front plate 112 may be correspondingly adjusted.

Figure 2:
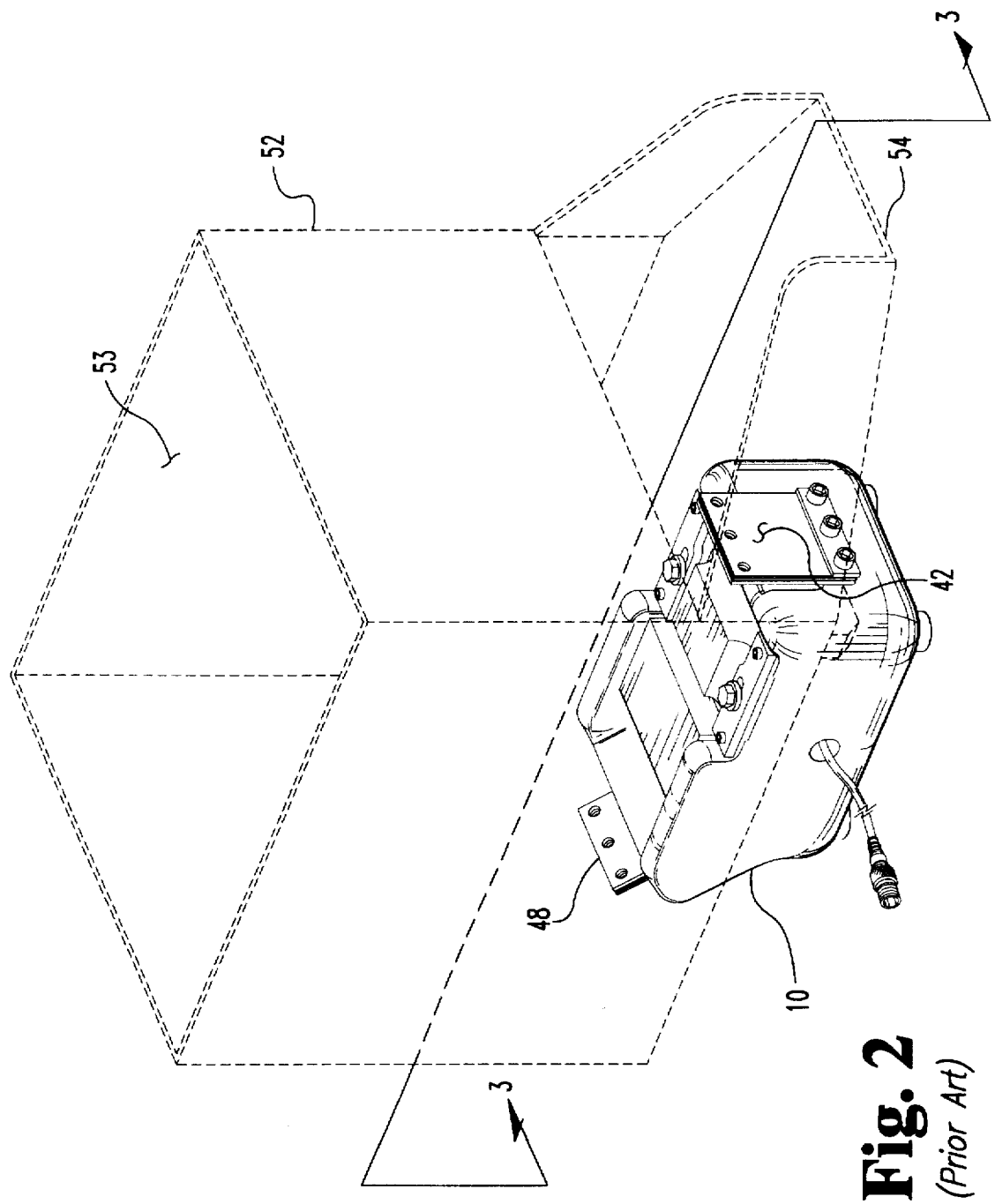
FIG. 2 is a perspective view of the vibratory drive unit of FIG. 1 showing a parts bin mounted thereto.

Springs 42 and 48 are further provided and are attached to vibratory drive unit 100 identically as described with respect to vibratory drive unit 10 of FIGS. 1–3.

Either one of left side plate 104 or right side plate 108, shown specifically in FIGS. 4–6 as left side plate 104, defines a bore 150 therethrough. Preferably, bore 150 is threaded to receive a correspondingly threaded electrical connector housing 152 therein. Electrical connector housing 152 is hollow and sized to receive electrical connector 38 therein. Conically shaped washer 154, preferably formed of a flexible material, has an inner and outer surface, the inner surface of which receives electrical connector 38, and the other surface of which is received within electrical connector housing 152. An electrical connector housing cap 156 is threaded complementarily to that of electrical connector housing 152 such that electrical connector housing 152 is threadingly received within electrical connector housing cap 156 with the washer 154 and connector 38 assembly positioned therein. With such an electrical connector configuration, electrical conductor 36 is completely contained within the cavity defined by plates 102, 104, 108, 112, 120, and 122. Electrical connector 38 is secured to left side plate 104 via the threaded connection between electrical connector housing 152 and bore 150. Advantageously, electrical conductor 36 and the electrical connection between conductor 36 and coil 140 are thereby protected from wear and tear within the confines of vibratory drive unit 100.

At least one of side plates 104 and 108 further includes a slot defined therethrough between front face 146 of coil 140 and front plate 112. Preferably, as is shown in the figures, left side plate 104 defines such a slot 158 therethrough, and right side plate 108 defines such a slot 160 therethrough. Advantages obtained by slots 158 and/or 160, as well as the configuration of coil 140 in relation to the cavity defined by plates 102, 104, 108, and 112 and mass 134, will be more fully described with respect to FIG. 6.

It should now be appreciated that the vibratory drive unit 100 of the present invention is uniquely formed of modular components, which components can be easily replaced if worn or damaged. For example, if the bores defined within front plate 112 for receiving fasteners 44 therein become stripped, a replacement front plate 112 may easily be substituted therefor simply by removing screws 114, 116, and 118, removing and replacing front plate 112, and resecuring fasteners 114, 116, and 118 thereto. In this manner, any of the individual modular components of vibratory drive unit 100 that become damaged or excessively worn can be easily replaced in like manner. Such replaceability can significantly decrease down time of vibratory drive unit 100 over prior art vibratory drive units that must undergo a lengthy machining process, if they can be repaired at all. Additionally, such replaceability provides a vibratory drive unit with a significant cost advantage over prior art vibratory drive units that cannot be repaired and must therefore be scrapped.

Referring now to FIG. 6, vibratory drive unit 100 is shown attached to a parts bin 52, in a similar manner as the vibratory drive unit 10 of FIG. 3. FIG. 6 is included to illustrate two additional advantageous features of vibratory drive unit 100. One such additional advantageous feature is the inclusion of slot 158 and/or 160. As shown in FIG. 6, slot 160 (as well as slot 158) is preferably sized so that it is wider than the maximum distance between the front face 146 of coil 140 and the pole face 58 of parts bin 52. With slot 160 so configured, a width gauge, such as a feeler gauge (not shown), can be inserted therethrough and between the front face 146 of coil 140 and pole face 58 of parts bin 52. The position of coil face 146 relative to pole face 58 can thus be accurately and easily provided through the use of such a feeler gauge extending through slot 160. Preferably, two such slots 158 and 160 are provided so that a width gauge can be extended through both slots 158 and 160 simultaneously such that it extends across the entire width of coil face 146 and pole face 58. Such a configuration permits gap 25 to be accurately set along the entire width of coil face 146 and pole face 58, and thereby avoid any inaccuracies due to twisting of coil 140 within the cavity of vibratory drive unit 100. Providing a pair of such slots 158 and 160 further permits a width gauge extending therethrough to be supported by the slots to thereby provide for hands-free adjustment of coil 140.

Another advantageous feature provided by vibratory drive unit 100 provides for efficient circulation of air about coil 140. Specifically, ears 142a and 142b of coil 140 extend into recesses 144a and 144b, respectively. Providing coil 140 with ears 142a and 142b permits an air gap to be established between coil 140 and side plates 104 and 108, respectively. Further, while slots 158 and 160 permit an accurate setting of gap 25, slots 158 and 160 also provide for increased air flow between face 146 of coil 140 and face 58 of parts bin 52. Further, coil 140 has been configured such that regardless of the width of gap 25, the rear face 141 of coil 140 and the front face 133 of mass 134 define an air gap 162 therebetween. Finally, the bottom surface 143 of coil 140 and bottom plate 102 define an air gap 164 therebetween. Thus, regardless of the position of coil 140 with respect to mass 133 and plate 56 of parts bin 52, vibratory drive unit 100 provides for air flow entirely about coil 140. Such air flow tends to decrease the operating temperature of coil 140, and thereby prolong its operating life.

It should now be appreciated that vibratory drive unit 100 further provides for efficient operation of vibratory drive coil 140 in two respects. First, provisions are made within vibratory drive unit 100, namely slots 158 and 160, to permit accurate positioning of the front face 146 of coil 140 with respect to the pole face 58 of plate 56. Second, the structure of coil 140, as well as the cavity of vibratory drive unit 100 containing coil 140, which cavity is defined by plates 102, 104, and 108, mass 134, and plate 56 of parts bin 52, have been optimally configured to permit air flow about coil 140.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vibratory drive unit comprising:
    a housing having a front wall, a rear wall opposite said front wall, a bottom wall extending therebetween and a pair of opposing side walls each extending from said front wall to said rear wall and connected to said bottom wall, said front, rear, bottom and opposing side walls defining a cavity therebetween;
    a mass mounted within said cavity;
    a parts bin attached to said drive unit via a number of drive springs, said parts bin having a drive plate extending into said cavity; and
    vibratory drive means adjustably mounted within said cavity between said mass and said drive plate, said vibratory drive means positioned relative to said mass, said drive plate, said bottom wall and each of said opposing side walls, to define an air gap therebetween.

2. The vibratory drive unit of claim 1 wherein one of said opposing sidewalls defines a slot therethrough and positioned between said vibratory drive means and said drive plate.

3. The vibratory drive unit of claim 1 wherein said vibratory drive unit is an electromagnetic coil.

4. The vibratory drive unit of claim 1 wherein one of said opposing sidewalls defines a bore therethrough;
    and further including an electrical power cord having a first end electrically connected to said electromagnetic coil, said cord having a second opposite end attached to an electrical connector, said electrical connector received within said bore and detachably mounted to said one of said opposing sidewalls.

5. The vibratory drive unit of claim 4 wherein said bore and said electrical connector are matingly threaded;
    and wherein said electrical connector is detachably mounted to said one of said opposing sidewalls via threaded attachment to said bore.

6. The vibratory drive unit of claim 4 wherein said electrical connector includes:

a terminal portion electrically connected to said drive coil;

a collar portion attached to said terminal portion; and a terminal positioning member disposed inside said collar portion, said terminal positioning member receiving said terminal portion therein and orienting said terminal portion to a predefined position within said collar portion.

7. The vibratory drive unit of claim 6 wherein said terminal portion defines a threaded portion thereon, and said collar portion defines a matingly threaded portion therein, said collar portion attached to said terminal portion via threaded connection.

8. The vibratory drive unit of claim 1 wherein said front wall is detachably mounted to said bottom wall and each of said opposing sidewalls, said rear wall is detachably mounted to said bottom wall and each of said opposing sidewalls, and each of said opposing sidewalls are detachably mounted to said bottom wall.

* * * * *